(12) United States Patent
Yu et al.

(10) Patent No.: US 9,950,803 B2
(45) Date of Patent: Apr. 24, 2018

(54) AIRPLANE SUSPENSION COWLING STRUCTURE WITH WING-MOUNTED ARRANGEMENT

(71) Applicants: Commercial Aircraft Corporation of China, Ltd, Shanghai (CN); Commercial Aircraft Corporation of China, Ltd Shanghai Aircraft Design and Research Institute, Shanghai (CN)

(72) Inventors: Zhehui Yu, Shanghai (CN); Miao Zhang, Shanghai (CN); Meihong Zhang, Shanghai (CN); Fei Xue, Shanghai (CN); Tiejun Liu, Shanghai (CN); Dongyun Zhang, Shanghai (CN); Junhong Wang, Shanghai (CN); Pan Cheng, Shanghai (CN); Yong Lu, Shanghai (CN); Xiaoyan Liu, Shanghai (CN)

(73) Assignees: COMMERCIAL AIRCRAFT CORPORATION OF CHINA, LTD. SHANGHAI AIRCRAFT DESIGN AND RESEARCH INSTITUTE, Shanghai (CN); COMMERCIAL AIRCRAFT CORPORATION OF CHINA, LTD., Shanghai (CN)

( * ) Notice: Subject to any disclaimer, the term of this patent is extended or adjusted under 35 U.S.C. 154(b) by 3 days.

(21) Appl. No.: 14/893,717

(22) PCT Filed: Aug. 28, 2014

(86) PCT No.: PCT/CN2014/085418
§ 371 (c)(1),
(2) Date: Nov. 24, 2015

(87) PCT Pub. No.: WO2015/058586
PCT Pub. Date: Apr. 30, 2015

(65) Prior Publication Data
US 2016/0114897 A1    Apr. 28, 2016

(30) Foreign Application Priority Data

Oct. 24, 2013    (CN) .......................... 2013 1 0509001

(51) Int. Cl.
*B64D 29/02*    (2006.01)
*B64C 7/02*    (2006.01)
*B64D 27/26*    (2006.01)

(52) U.S. Cl.
CPC ................ *B64D 29/02* (2013.01); *B64C 7/02* (2013.01); *B64D 2027/264* (2013.01)

(58) Field of Classification Search
CPC ........ B64D 29/02; B64D 29/00; B64D 29/04; B64D 29/06; B64D 29/08; B64D 27/18; B64D 27/26; B64D 2027/264; B64C 7/02
See application file for complete search history.

(56) References Cited

U.S. PATENT DOCUMENTS 4,410,150 A    10/1983  Lahti
4,489,905 A *  12/1984  Bengelink ................. B64C 7/02
                                                                244/130

(Continued)

FOREIGN PATENT DOCUMENTS

| CN | 101801789 A | 8/2010 |
| CN | 103612769 A | 3/2014 |
| FR | 2899201 A1 | 10/2007 |

OTHER PUBLICATIONS

International Search Report, PCT/CN2014/085418, entitled: Airplane Suspension Cowling Structure With Wing-Mounted Arrangement, dated Dec. 3, 2014.

*Primary Examiner* — Brian M O'Hara
(74) *Attorney, Agent, or Firm* — Hamilton, Brook, Smith & Reynolds, P.C.

(57) ABSTRACT

Provided is an airplane suspension (20) fairing structure with a wing-mounted arrangement, the fairing structure (Continued)

comprising a front fairing located in front of the leading edge (31) of a wing and a rear fairing located at the back of the leading edge (31) of the wing; the vertical section line (G) of the front fairing is curved, ascending along air flow direction from a start point (p) of an engine nacelle (10) to the maximum height position and then descending and extending below the lower surface (32) of the wing. In the present invention, due to the curved vertical section line of the front fairing of the suspension, inner space of the suspension is met only in the position requiring greater inner space, thus enabling the engine to be mounted close to the wing without additional devices; and the fairing aerodynamic surface of the suspension will not extend to the upper surface of the wing, avoiding interference of the suspension with the wing during cruising.

3 Claims, 2 Drawing Sheets

(56) References Cited

U.S. PATENT DOCUMENTS

| | | | |
|---|---|---|---|
| 8,469,309 B2 * | 6/2013 | Stuart | B64D 27/26 244/54 |
| 2011/0243719 A1 | 10/2011 | Murphy et al. | |

* cited by examiner

AIRPLANE SUSPENSION COWLING STRUCTURE WITH WING-MOUNTED ARRANGEMENT

This application is the U.S. National Stage of International Application No. PCT/CN2014/085418, filed Aug. 28, 2014, which designates the U.S., published in Chinese, and claims priority under 35 U.S.C. §§ 119 or 365(c) to Chinese Application No. 201310509001.4, filed Oct. 24, 2013.

FIELD OF THE DISCLOSURE

The present invention generally relates to the field of airplane aerodynamic configuration design, and more particularly to a fairing structure, especially a front fairing structure, for an airplane suspension with a wing-mounted arrangement.

BACKGROUND OF THE DISCLOSURE

A wing is an important part of an airplane for providing a lift force to the airplane. During the flight of the airplane, both an upper surface and a lower surface of the wing can generate a lift force, and the upper surface is the main lift force surface. In order to maintain the efficiency of generating lift force of the wing, disturbance to the upper surface of the wing should be avoided as much as possible. In the wing-mounted arrangement, the suspension is a part connecting an engine and the wing. A fairing aerodynamic surface of the suspension is a directly visible part exposed outside of the suspension. As shown in FIGS. 1-2, the fairing aerodynamic surface G' of the suspension 20 generally extends from a start point P close to a leading edge of an engine nacelle 10 towards the rear part of the airplane in the airflow direction, and has an inner side surface and an outer side surface. A rear part of the fairing aerodynamic surface G' at the lower surface 32 of the wing and close to a trailing edge of the wing 30 shrinks to be a line or a surface with a relative small width. As for the airplane with a wing-mounted arrangement, the main difficulty of mounting the engine to the wing in a close range lies in the arrangement of the suspension having certain inner space. In the prior art as shown in FIGS. 1 and 2, the fairing aerodynamic surface G' of the suspension extends rewards to the upper surface of the wing at a substantially the same maximum height $H_{max}$ after rising to the maximum height position, that is to say, an intersecting point O' between the fairing aerodynamic surface G' and the leading edge 31 of the wing is located on the upper surface of the wing, which will cause disturbance to the wing 30, specifically the upper surface of the wing, thereby reducing the lift force of the airplane and decreasing the performance of the airplane. Thus, the disturbance to the upper surface of the wing needs to be reduced if the engine is desired to be mounted to the wing in a close range.

For facilitating the description, the fairing aerodynamic surface of the suspension will be abbreviated to "suspension" in the following description.

The suspension comprises structures needed by suspending the engine of the airplane, and inner systems, electrical cables, seals and structure members that are necessary for maintaining the operation of the engine and the airplane, and these components has a certain requirements for the inner space of the suspension. In order to ensure the inner space of the suspension, the following solutions are generally utilized.

1. The distance between the engine and the leading edge of the wing is increased, so that the inner space of the suspension is increased, and thus the suspension is kept under the leading edge of the wing.

2. The suspension has a relative large height and extends rearwards to a position above the leading edge of the wing, that is to say, the suspension extends to the upper surface of the wing.

3. The suspension is kept below the leading edge of the wing, but the width of the suspension needs to be increased.

These solutions have both advantages and disadvantages. In the first solution, the length of the landing gear is increased since the distance between the engine and the leading edge of the wing is increased, which will increase the weight and the fuel consumption of the airplane, reduce the payload of the airplane and affect the carrying capacity of the airplane. In the second solution, the height of the landing gear is not increased, thus the disadvantageous influence in the first solution can be avoided, but the flight performance of the airplane is reduced. That is to say, when the suspension extends rearwards to the position above the wing, the suspension will cause a flow separation on the upper surface of the wing in the case of small angle of attack so that the drag force is increased, or causes a flow separation at a large area on the upper surface of the wing in the case of large angle of attack so that the pitching up of the moment happens in advance, which will endanger the safety of the airplane, thus the second solution has a significant influence on the upper surface of the wing. In the third solution, the disadvantages influence caused by increasing the length of the landing gear in the first solution and the disturbance to the upper surface of the wing in the second solution can be avoided, but increasing the width of the suspension can reduce the area of the cross section of the flow-out channel of the engine, which will block the flowing in the engine and reduce the engine thrust, thereby reducing the propulsive efficiency of the engine.

In order to eliminate or reduce the disadvantageous influence caused by the suspension extending to the position above the wing, WO8401347A1 discloses that an auxiliary device is arranged close to the fairing of the suspension, which can reduce the disadvantageous influence on the lift characteristic of the airplane due to the suspension extending to the position above the wing by inducing impact wave on the upper surface of the wing. U.S. Pat. No. 3,960,345 discloses that a fin is provided to the nacelle surface of the wing, which can suppress the vortex caused by the engine or the suspension extending to the position above the wing, increase the lift force and drag force of the airplane, enhance the stability, and reduce the disadvantageous influence on the airplane due to the downwash. U.S. Pat. No. 3,968,946A discloses that a movable fairing is provided to fill the gap between the fixed fairing and the leading edge slat when the engine or the suspension extends to the upper surface of the wing. The above solutions disclosed in the above patents overcome the disadvantageous influences due to the suspension extending to the position above the wing by adding an additional device, which may increase the additional weight of the airplane, reduce the airplane payload, and reduce the carrying performance of the airplane.

SUMMARY

In order to overcome the above defects existing in the prior art, the present invention provides an airplane suspension fairing structure with a wing-mounted arrangement, which can maintain or enhance the aerodynamic performance of the airplane while mounting the engine to the wing in a close range.

In the practical engineering, the suspension of the airplane does not need to have a large space everywhere for containing the components such as inner systems, electrical cables, seals and structure members. Actually, the space at some relatively important position needs to be larger than that at other positions. For example, at the interface between a fire area and a non-fire area of the suspension, due to the existence of the firewall, a larger seal assembly therein requires a larger inner space, thus the requirement for a larger inner space only exists at the specific position (for example, the position of the firewall of the suspension). With regard to the above circumstances, the present invention is proposed to overcome the defects in the prior art by improving the airplane suspension fairing structure.

According to one embodiment, the present invention provides an airplane suspension fairing structure with a wing-mounted arrangement, the fairing structure comprising a front fairing which is placed in front of a leading edge of a wing and a rear fairing which is placed at the back of the leading edge of the wing, wherein a vertical section line of the front fairing is a curved line and rises to the maximum height position from a start point close to an engine nacelle in the airflow direction and then descends and extends to a position below a lower surface of the wing.

Advantageously, the maximum height position is the position where the suspension requires a maximum inner space.

According to one embodiment, the maximum height position is a first position where is higher than an upper surface of the wing.

According to one embodiment, the vertical section line of the front fairing is S-shaped having a curvature that is reversed after descending to a second position from the first position in the airflow direction, descending to a minimum position at a third position, and extending to a position below the lower surface of the wing at a fourth position.

Advantageously, a ratio of a height difference between the first position and the fourth position to a distance between the start point and the fourth position is no more than 0.016.

Advantageously, a ratio of a distance between the first position and the fourth position to the distance between the start point and the fourth position is no more than 0.3.

In the present invention, the vertical section line of the front fairing of the suspension is designed to be a curved line, preferably S-shaped, and only at the position (for example, the position close to the firewall) where a relatively large inner space is needed, the height of the fairing is increased to meet the requirement for the inner space of the suspension, thus when the fairing aerodynamic surface of the suspension reaches the leading edge of the wing, the longitudinal height of the suspension is below the leading edge of the wing, so that the engine can be mounted to the wing in a close range, the landing gear of the airplane does not need to be lengthened, and extra devices do not need to be added, thus there is no additional weight. The fairing aerodynamic surface of the suspension cannot extend to the upper surface of the wing, so that the disturbance of the suspension to the wing is avoided during cruising flight. Additionally, the width of the suspension is not increased, thus there is no disadvantageous influence on the engine thrust efficiency. Moreover, the present invention enables the suspension to have necessary arrangement space (enveloping structure and firewall pipe) while maintaining a good flight performance of the airplane.

BRIEF DESCRIPTION OF THE DRAWINGS

Other characteristics and advantages will become apparent from the following description of the invention. In the figures, the same reference signs indicate the same or similar parts, in which.

DETAILED DESCRIPTION

Figure 1:
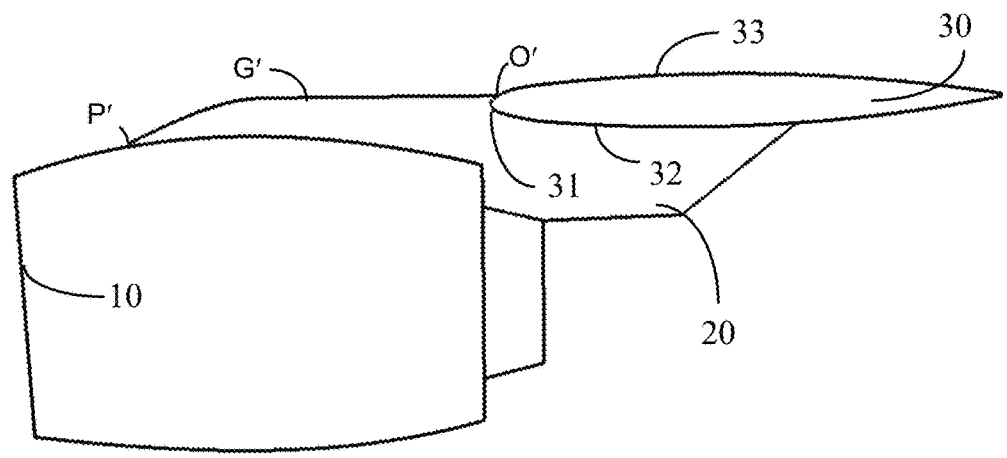
FIG. 1 is a schematic view of an engine and a wing connected by an airplane suspension with a wing-mounted arrangement, illustrating a fairing structure of the airplane suspension in the prior art.
Figure 2:
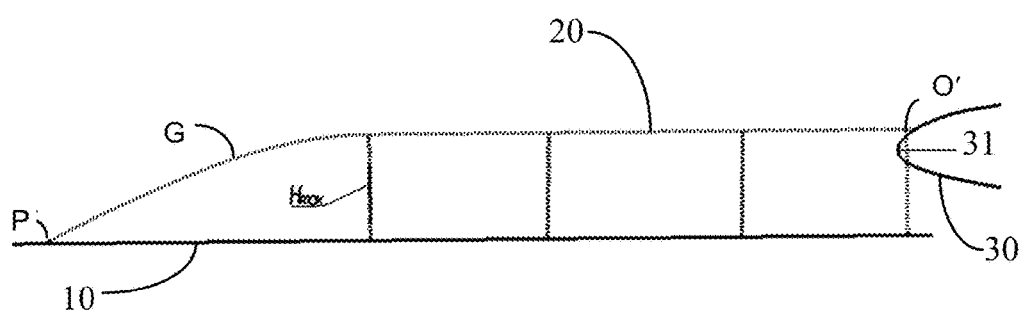
FIG. 2 is a schematic view of an aerodynamic surface of a front fairing of a suspension in the prior art.

The following description will describe an airplane suspension fairing structure with a wing-mounted arrangement. In the following description, some orientation terms, such as "left", "right", "top", "bottom", "front", "back", "guide", "forwards", and "backwards", are used with reference to the directions shown in the drawings, and the orientation terms are used as example rather than limitation. However, it should be appreciated that the described embodiments are only used to illustrate the special form for implementing and applying the present invention in an exemplary manner, rather than limit the scope of the present invention.

Figure 3:
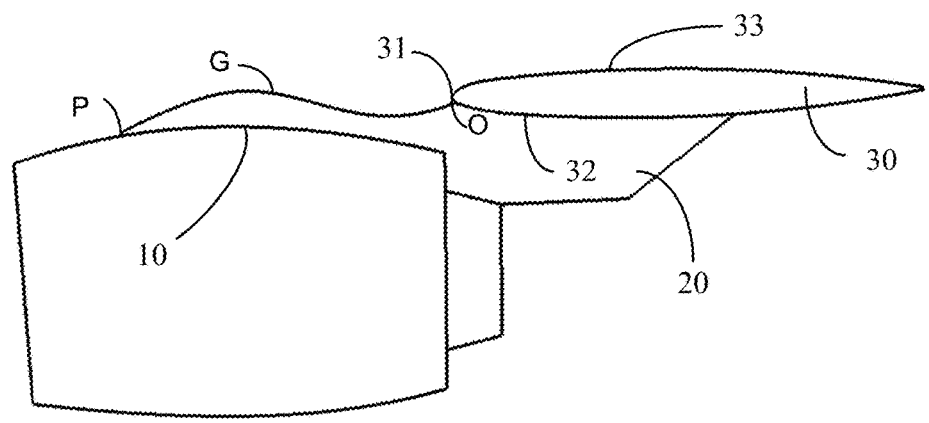
FIG. 3 is a schematic view of an engine and a wing connected by a fairing structure of a suspension according to the present invention.
Figure 4:
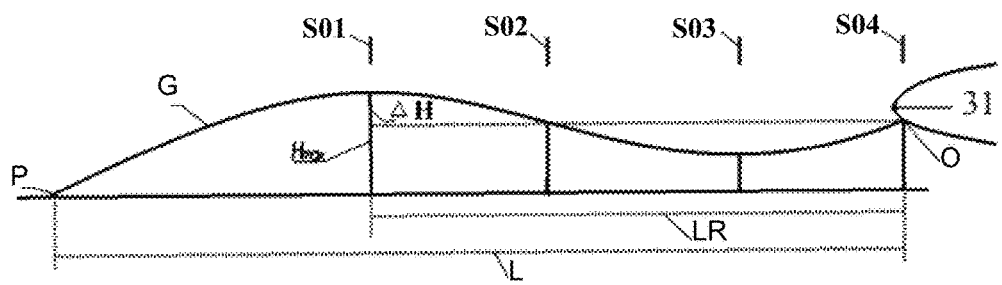
FIG. 4 is a schematic view of an aerodynamic surface of a front fairing of a suspension according to the present invention.

Referring to FIGS. 3 and 4, according to one preferred embodiment of the present invention, the improving design for a fairing structure of a suspension 20 can be implemented by configuring a vertical section line G of a front fairing of the suspension to be S-shaped. In this way, the front fairing is higher than a leading edge line of the wing, the longitudinal height of the suspension 20 is gradually reduced in the airflow direction, and the leading edge 31 maintains a complete wing head, thereby avoiding the influence due to the aerodynamic configuration of the suspension 20. Additionally, the superficial airflow of the suspension 20 flows along the surface of the suspension, and the suspension 20 guides the airflow to flow below the leading edge 31, thereby effectively reducing or avoiding the disturbance of the superficial airflow of the suspension 20 to the upper surface 33 of the wing.

Specifically, the vertical section line G of the suspension 20 starts from a front point P. The vertical section line G rises gradually and reaches a maximum height $H_{max}$ at a position where the suspension 20 needs to have a maximum inner space, that is, the maximum height position of the suspension 20, i.e., a first position S01 (for example, the location of the firewall). In some embodiments, the maximum height $H_{max}$ is possibly higher than the leading edge 31 of the wing. Then, the vertical section line G descends slowly, and a curvature of the vertical section line G is reversed at a second position S02, that is to say, the vertical section line G is transformed to a concave curve from a convex curve. Then, the vertical section line G descends to a minimum position at a third position S03, rises smoothly and contacts the wing and extends below the leading edge 31 of the wing at a fourth position S04. In this way, the vertical section line G of the suspension 20 is configured to be S-shaped. The advantage of this configuration lies in that after the suspension 20 reaches the maximum position, a space is left in the area along the airflow direction so that the height of the suspension 20 can be restored and transited to gradually extend to the position below the leading edge 31 of the wing, and finally terminate at the lower surface 32 of the wing. As shown in FIGS. 3 and 4, the intersecting point O between the vertical section line G of the suspension 20 and the leading edge 31 of the wing is located below the leading edge 31 of the wing.

Figure 5:
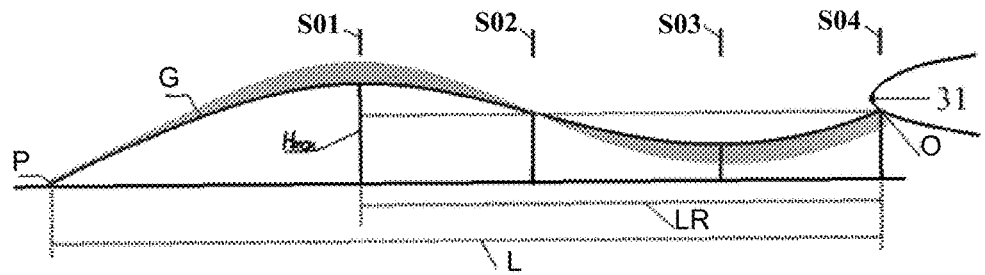
FIG. 5 is a view similar to FIG. 4, illustrating a curvature profile of the aerodynamic surface of the front fairing of the suspension.

The following description will define some parameters and introduce the above preferred embodiments with reference to FIGS. 4 and 5.

The vertical section line G of the suspension 20 intersects with the lower surface 32 of the wing at the point O at the fourth position S04. The distance between the front start point P of the vertical section line G of the suspension 20 and the fourth position S04 is denoted as L. The second position S02 where the curvature is reversed is generally located in front of the point O, and has a distance LR from the point O, that is to say, the distance between the first position SO1 and the fourth position S04 of the suspension 20 is denoted as LR, and the difference between the heights of the suspension 20 at the first position S01 and at the fourth position S04 is denoted as ΔH, ΔH/L is defined as a relative height of the suspension 20, which is a dimensionless number for describing the convex degree of the S-shaped front fairing. In some embodiments, parameter ΔH/L is a value typically no more than 0.016. The meaning of the parameter ΔH/L lies in limiting the height of the convex part of the vertical section line G of the suspension 20, preventing the generated wake flows being too high and avoiding the disadvantageous influence on the downstream wing.

LR/L is defined as a space recovering factor, which is a dimensionless number. In some embodiments, parameter LR/L is a value typically no more than 0.3, This parameter is used to describe the size of the space of the S-shaped front fairing between the maximum point (i.e., the first position S01) and the position extending to the position below the leading edge of the wing. The meaning of this parameter lies in enabling the suspension 20 to smoothly restore to the lower surface of the wing from the maximum point, avoiding the disadvantageous pressure gradient, and ensuring the aerodynamic performance of the airplane.

FIG. 5 also illustrates a schematic curvature profile of the vertical section line G of the front fairing of the suspension 20, The person skilled in the art can design the size of the curvature of the convex curve and the concave curve respectively depending on the actual requirements, and thereby change the height at the first position SO1 and the third position S03 to achieve different space and/or airflow distribution. Meanwhile, it should be appreciated that besides the above illustrated embodiments, the vertical section line G of the front fairing according to the present invention may also be configured in any other appropriate curve forms, including but not limiting to parabola, smooth curve, curved section or polyline.

The above illustrates and describes basic principles, main features and advantages of the present invention. Those skilled in the art should appreciate that the above embodiments do not limit the present invention in any form. Technical solutions obtained by equivalent substitution or equivalent variations all fall within the scope of the present invention.

What is claimed is:

1. An airplane suspension fairing structure with a wing-mounted arrangement, the fairing structure comprising a front fairing located in front of a leading edge of a wing and a rear fairing located behind the leading edge of the wing,
    wherein a vertical section line of the front fairing is curved, ascending along airflow direction from a start point close to an engine nacelle to a maximum height position and then descending and extending below a lower surface of the wing, the vertical section line defining a shape of a top surface of the fairing,
    wherein the maximum height position is a first position which is higher than the leading edge of an upper surface of the wing, wherein the vertical section line of the front fairing is S-shaped having a curvature that is reversed after descending to a second position from the first position in the airflow direction, descending to a third position which is a minimum height position and extending to a fourth position below the lower surface of the wing,
    wherein a ratio of a height difference (ΔH) between the first position and the fourth position to a distance between the start point and the fourth position is no more than 0.016.

2. The airplane suspension fairing structure with a wing-mounted arrangement according to claim 1, wherein the maximum height position is the position where the airplane suspension requires a maximum inner space.

3. The airplane suspension fairing structure with a wing-mounted arrangement according to claim 1, wherein a ratio of a distance between the first position and the fourth position to the distance between the start point and the fourth position is no more than 0.3.

* * * * *

UNITED STATES PATENT AND TRADEMARK OFFICE
CERTIFICATE OF CORRECTION

PATENT NO. : 9,950,803 B2
APPLICATION NO. : 14/893717
DATED : April 24, 2018
INVENTOR(S) : Zhehui Yu et al.

Page 1 of 1

It is certified that error appears in the above-identified patent and that said Letters Patent is hereby corrected as shown below:

On the Title Page

(73) Assignees:
Please delete:
"COMMERCIAL AIRCRAFT CORPORATION OF CHINA, LTD. SHANGHAI AIRCRAFT DESIGN AND RESEARCH INSTITUTE, Shanghai (CN), COMMERCIAL AIRCRAFT CORPORATION OF CHINA, LTD., Shanghai (CN)."

Please insert:
--COMMERCIAL AIRCRAFT CORPORATION OF CHINA, LTD., Shanghai (CN); COMMERCIAL AIRCRAFT CORPORATION OF CHINA, LTD. SHANGHAI AIRCRAFT DESIGN AND RESEARCH INSTITUTE, Shanghai (CN).--

Signed and Sealed this
Twenty-first Day of August, 2018

Andrei Iancu
*Director of the United States Patent and Trademark Office*